(12) United States Patent
Berger et al.

(10) Patent No.: US 11,741,227 B2
(45) Date of Patent: Aug. 29, 2023

(54) PLATFORM SECURITY MECHANISM

(71) Applicant: Intel Corporation, Santa Clara, CA (US)

(72) Inventors: Michael Berger, Jerusalem (IL);
Xiaoyu Ruan, Folsom, CA (US);
Purushottam Goel, Portland, OR (US);
Mahesh Natu, Folsom, CA (US);
Bharat Pillilli, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 188 days.

(21) Appl. No.: 17/354,125

(22) Filed: Jun. 22, 2021

(65) Prior Publication Data

US 2021/0312044 A1 Oct. 7, 2021

(51) Int. Cl.
*G06F 21/55* (2013.01)
*G06F 21/57* (2013.01)

(52) U.S. Cl.
CPC .......... *G06F 21/556* (2013.01); *G06F 21/554* (2013.01); *G06F 21/572* (2013.01)

(58) Field of Classification Search
CPC ..... G06F 21/556; G06F 21/554; G06F 21/572
See application file for complete search history.

(56) References Cited

U.S. PATENT DOCUMENTS

| | | | |
|---|---|---|---|
| 4,611,333 A | 9/1986 | McCallister | |
| 7,886,094 B1 * | 2/2011 | Tamasi | G09G 5/363 710/104 |
| 9,871,651 B2 | 1/2018 | Belenky | |
| 10,491,578 B1 | 11/2019 | Hebert | |
| 10,530,567 B2 | 1/2020 | Sugahara et al. | |
| 2005/0147246 A1 | 7/2005 | Agrawal | |
| 2006/0045264 A1 | 3/2006 | Kocher et al. | |
| 2009/0116644 A1 | 5/2009 | Klimov | |
| 2014/0269666 A1 | 9/2014 | Marsh | |
| 2015/0039890 A1 * | 2/2015 | Khosravi | H04L 63/061 713/171 |
| 2017/0244546 A1 | 8/2017 | Stark | |
| 2018/0088625 A1 * | 3/2018 | Krithivas | G06F 21/725 |
| 2018/0129476 A1 | 5/2018 | Wesson | |

(Continued)

FOREIGN PATENT DOCUMENTS

EP 4020295 A1 6/2022
WO 2017222499 A1 12/2017

OTHER PUBLICATIONS

Extended European Search Report for European Patent Application No. 21195785.7 dated Mar. 1, 2022, 9 pages.

(Continued)

*Primary Examiner* — William S Powers
(74) *Attorney, Agent, or Firm* — Jaffery Watson Mendonsa & Hamilton LLP

(57) ABSTRACT

An apparatus comprising a computer platform, including a central processing unit (CPU) comprising a first security engine to perform security operations at the CPU and a chipset comprising a second security engine to perform security operations at the chipset, wherein the first security engine and the second security engine establish a secure channel session between the CPU and the chipset to secure data transmitted between the CPU and the chipset.

23 Claims, 12 Drawing Sheets

(56) References Cited

U.S. PATENT DOCUMENTS

| | | | |
|---|---|---|---|
| 2018/0152288 A1 | 5/2018 | Kang | |
| 2019/0089534 A1* | 3/2019 | McWilliams | H04L 9/0869 |
| 2019/0103961 A1* | 4/2019 | Chhabra | H04L 9/0841 |
| 2019/0318130 A1 | 10/2019 | Ghosh et al. | |
| 2020/0137031 A1 | 4/2020 | Pappachan et al. | |
| 2020/0183876 A1 | 6/2020 | Sharma et al. | |
| 2020/0226261 A1* | 7/2020 | Dewan | G06F 8/65 |
| 2021/0312045 A1 | 10/2021 | Bolotov et al. | |

OTHER PUBLICATIONS

International Search Report and Written Opinion for International Application No. PCT/US2022/019797 dated May 20, 2022, 9 pages.

Notification of Publication for Chinese Patent Application No. 202111360724 3 dated Jun. 30, 2022, 29 pages.

Final Office Action for U.S. Appl. No. 17/354,138 dated Nov. 4, 2022, 23 pages.

Non-Final Office Action for U.S. Appl. No. 17/354,138 dated Aug. 5, 2022, 19 pages.

Office Action for U.S. Appl. No. 17/354,138 dated Apr. 28, 2023, 24 pages.

\* cited by examiner

PLATFORM SECURITY MECHANISM

BACKGROUND OF THE DESCRIPTION

Components within a computing system platform include a central processing unit (CPU), memory, input/output (IO) ports and secondary storage, which are all included on a single substrate or microchip. Currently, systems are being developed in in which CPU packages within a platform are capable being switched (or swappable), while maintaining a permanent (e.g., soldered) chipset. However, having swappable CPUs may lead to compatibility problems between a newly inserted CPU package and the chipset.

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit to other equally effective embodiments.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
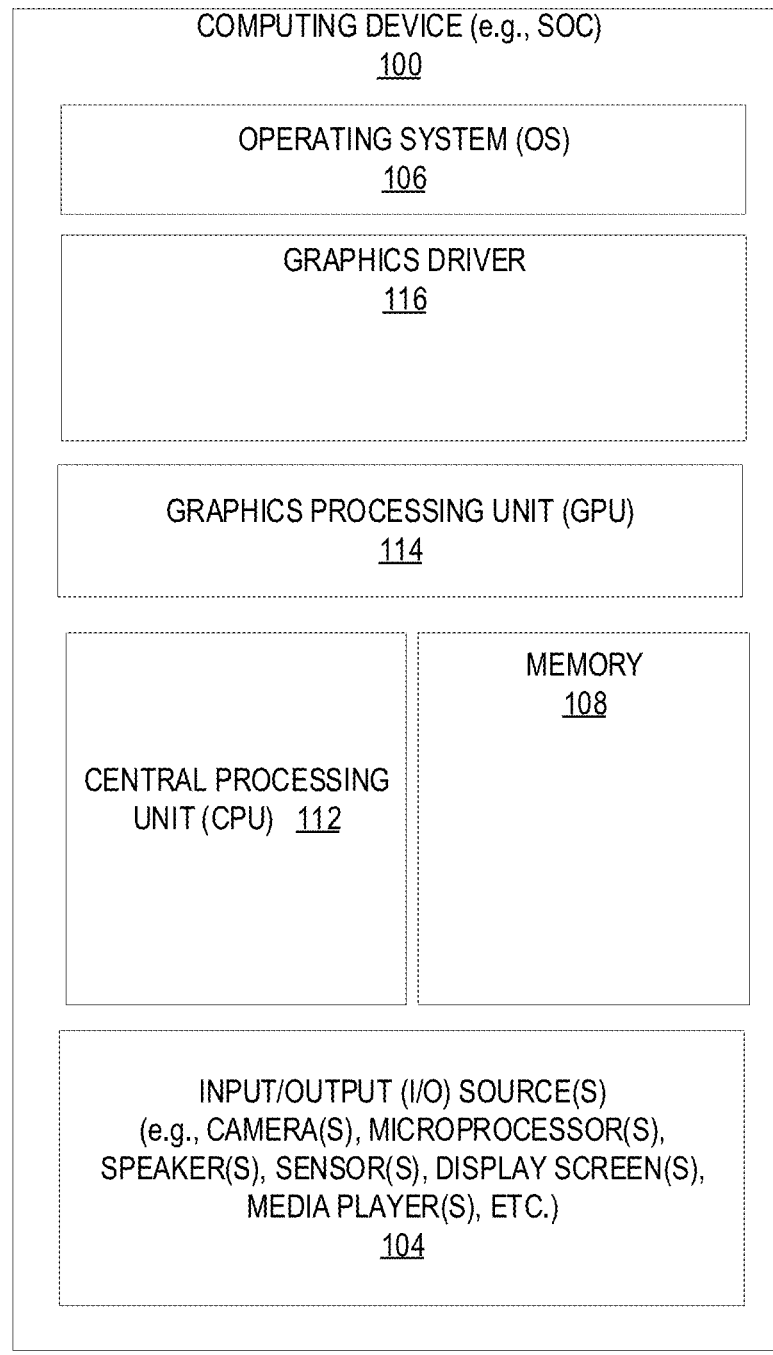
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
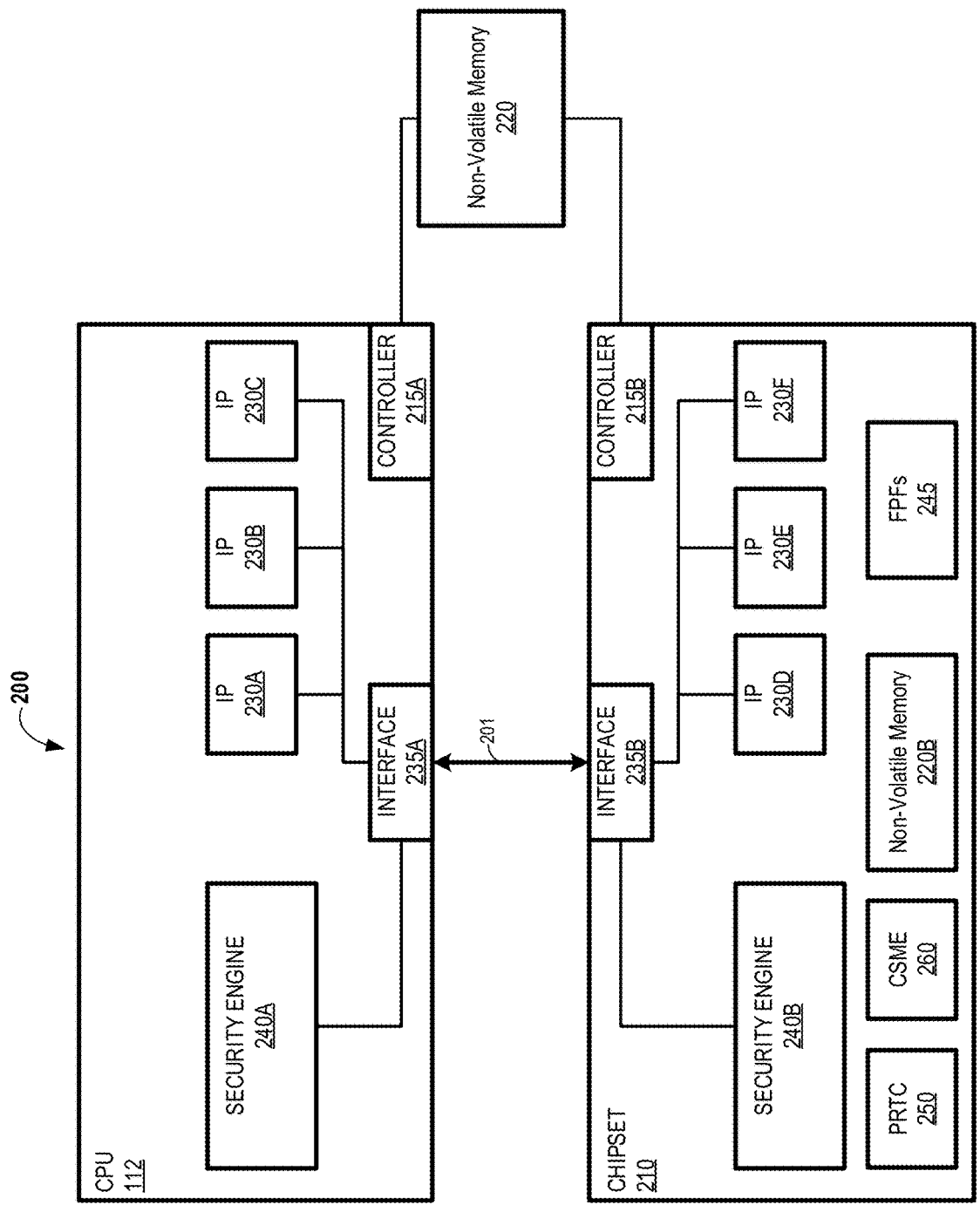
FIG. 2 illustrates one embodiment of a platform.

FIG. 2 illustrates one embodiment of a platform 200. As shown in FIG. 2, platform 200 includes CPU 112 and a chipset 210. In one embodiment, CPU 112 and chipset 210 are implemented on separate integrated circuit (IC) packages (or die). In a further embodiment, CPU 112 and chipset 210 each comprise an interface (e.g., interfaces 235A and 235B) to facilitate communication. In such an embodiment, each interface comprises a link controller. In still a further embodiment, CPU 112 and chipset 210 communicate via a direct media interface (DMI) 201. However, in other embodiments, other types of interfaces (e.g., a flexible display interface (FDI)) may be implemented.

CPU 112 and a chipset 210 further include interconnect protocol (IP) agents 230 (e.g., IP agents 230A-230C within CPU 112 and IP agents 230D-230F within chipset 210). In such an embodiment, the interconnect protocol provides a standardized interface to enable CPU and chipset vendors, as well as third parties, to design logic such as IP agents to be incorporated in chipset 210. IP agents 230 may include general purpose processors (e.g., in-order or out-of-order cores), fixed function units, graphics processors, I/O controllers, display controllers, etc. In such an embodiment, each IP agent 230 includes a hardware interface to provide standardization to enable the IP agent 230 to communicate with other platform 200 components. For example, in an embodiment in which IP agent 230 is a third-party visual processing unit (VPU), interface 235 provides a standardization to enable the VPU to access a memory.

Although discussed herein as a CPU and chipset, other embodiments may feature CPU 112 and chipset 210 as two system on chips (SOCs) (e.g., SOC 112 and SOC 210.

Mutual Authentication

Since CPU 112 and chipset 210 may be implemented on different IC packages, a CPU 112 may be replaced with another CPU. As discussed above, implementing swappable CPUs may lead to various problems. For example, CPUs that are sold directly to a customer, and not as part of a platform, do not undergo a platform configuration process. Thus, a failure in critical functionality, or boot failure, may occur (e.g., due to a file being encrypted with a CPU part-specific key specific to a CPU that has been swapped out for another CPU). In another example, critical functionality or boot failure may also occur when a file with an integrity signature based on a CPU part-specific key fails an integrity check after the CPU part is swapped with another.

According to one embodiment, CPU 112 and a chipset 210 also include security engines 240 to facilitate secure sessions between CPU 112 and chipset 210. In such an embodiment, each security engine 240 (e.g., security engine 240A and security engine 240B) performs various security operations (e.g., security processing, cryptographic functions, etc.) for CPU 112 and chipset 210.

In one embodiment, implementing a security engine 240 at both CPU 112 and chipset 210 enables security engine 240 on a swappable CPU 112 to access secure resources located at chipset 210, rather than CPU 112. In a further embodiment, security engine 240A and security engine 240B may also each program its respective link controller to operate a secure link once the secure channel session has been established. In this embodiment, the secure link secures any data transmitted between CPU 112 and chipset 210, regardless of which IP agent 230 peers are communicating (e.g., a transaction between IP agent 230A and IP agent 230F is protected by the secure session). As a result, CPU 112 and a chipset 210 operate as a virtual secure package.

In one embodiment, security engine 240A and security engine 240B establish secure channel session keys via a tuple of compatible security parameters prior to establishing the secure channel, which prevents a security exploit in which one agent (e.g., CPU 112) may be used to stage an attack on the other agent (chipset 210) by means of privilege escalation. Fixed and dynamic security parameters may be implemented. Fixed parameters may include parameters for which there is no functional reason to pair two dies/packages with incompatible parameters. Examples include die/package stock-keeping unit (SKU); die/package generation; die/package production state (e.g., pre-production vs production); and trusted agent security version number (SVN). Dynamic parameters may comprise parameters for which there is a functional reason for two dies/packages (e.g., CPU 112 and chipset 210) to be paired and have these parameters temporarily in incompatible state. For example, in cases where the parameter originates in die/package A and needs to be communicated to die/package B. One example is Block-on-Debug state.

According to one embodiment, security engine 240A and security engine 240B generate a secure channel session by synchronizing dynamic parameters to a compatible state, which may occur in an unsecure manner. It is permissible for synchronization to fail at this stage. For example, one package may be set and locked to a Design for Excellence (DFx) policy hiding Block on Debug assets while the other package is set and locked to a DFx policy that exposes the assets.

In one embodiment, security engine 240A and security engine 240B may each read an encrypted symmetric identity key (e.g., derived from package specific values) stored in a non-volatile memory 220 (e.g., via respective non-volatile memory controllers 215A and 215B) from a previous session to attempt to establish the secure channel. In such an embodiment, the identity key is used for each IC to recognize that there was a previous communication with the other IC using the same identity. In some embodiments, the identity key may also be implemented as a session key. However, in such embodiments, all sessions between a pair of ICs will use the same key to protect all the messages until the next identity change.

In one embodiment, the encryption/decryption key is unique per tuple of security parameter values (as the security parameters are a part of the "identity"), such that a change in any security parameter value at either security engine 240 results in deriving a different encryption/decryption key. In the case in which at least one of the security engines 240 is operating with a different set of security parameter values than that which existed in a previous session, a different decrypted identity key is generated for that security engine 240. In one embodiment, a decryption operation using that decryption key performed on the encrypted identity key will result in an identity key value which is different from the original decrypted identity key. Since the identity key is symmetric, security engine's 240 decrypted identity key value will be different from that of its peer security engine 240, which will lead to session establishment failure. Once the identity keys are matched, they may be used to generate session keys to establish a secure channel session.

Upon a determination that a previous identity key does not exist, or if there otherwise is a failure in session establishment, new identity keys are established on both sides using mutual authentication of certificates (e.g., on-die certificates), with the requirement being that two different identities result in two different certificates. This can be performed using any suitable protocol (e.g., security protocol and data model (SPDM)). In one embodiment, each security engine 240 enforces that the certificate received by the other security engine 240 is compatible to the expected values (e.g., the state of the peer security engine 240 is the same as the security engine 240 state). In such an embodiment, failure leads to session keys not being established.

Upon a determination that symmetric session keys (if different from the identity keys) are successfully established, further secure communication between security engine 240A and security engine 240B is confidentiality, integrity, and anti-replay protected. In one embodiment, security engine 240A and security engine 240B initially manage the session between CPU 112 and chipset 210. As a result, all secure communications are initially conducted via security engine 240A and security engine 240B. As discussed above, security engine 240A and security engine 240B programs their respective interface 235 with the session keys. Once interface 235 is programmed, any IP agent 230 in either CPU 112 or chipset 210 may securely communicate with any IP agents 230 on the other package. Additionally, the symmetric identity key may be encrypted and stored at non-volatile memory 220.

Figure 3A:
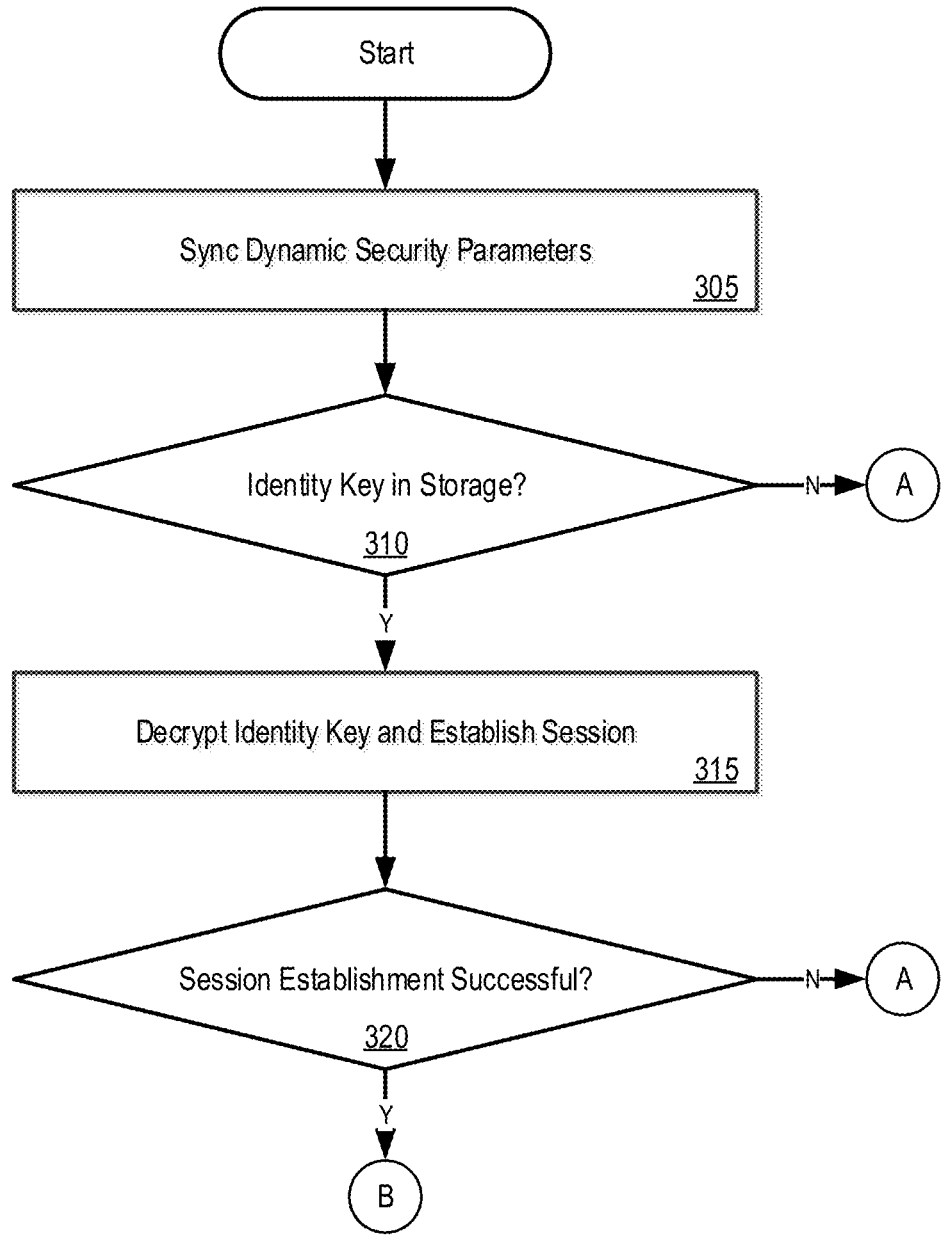
FIGS. 3A-3C a flow diagram illustrating one embodiment of a process for securing platform components.
Figure 3B:
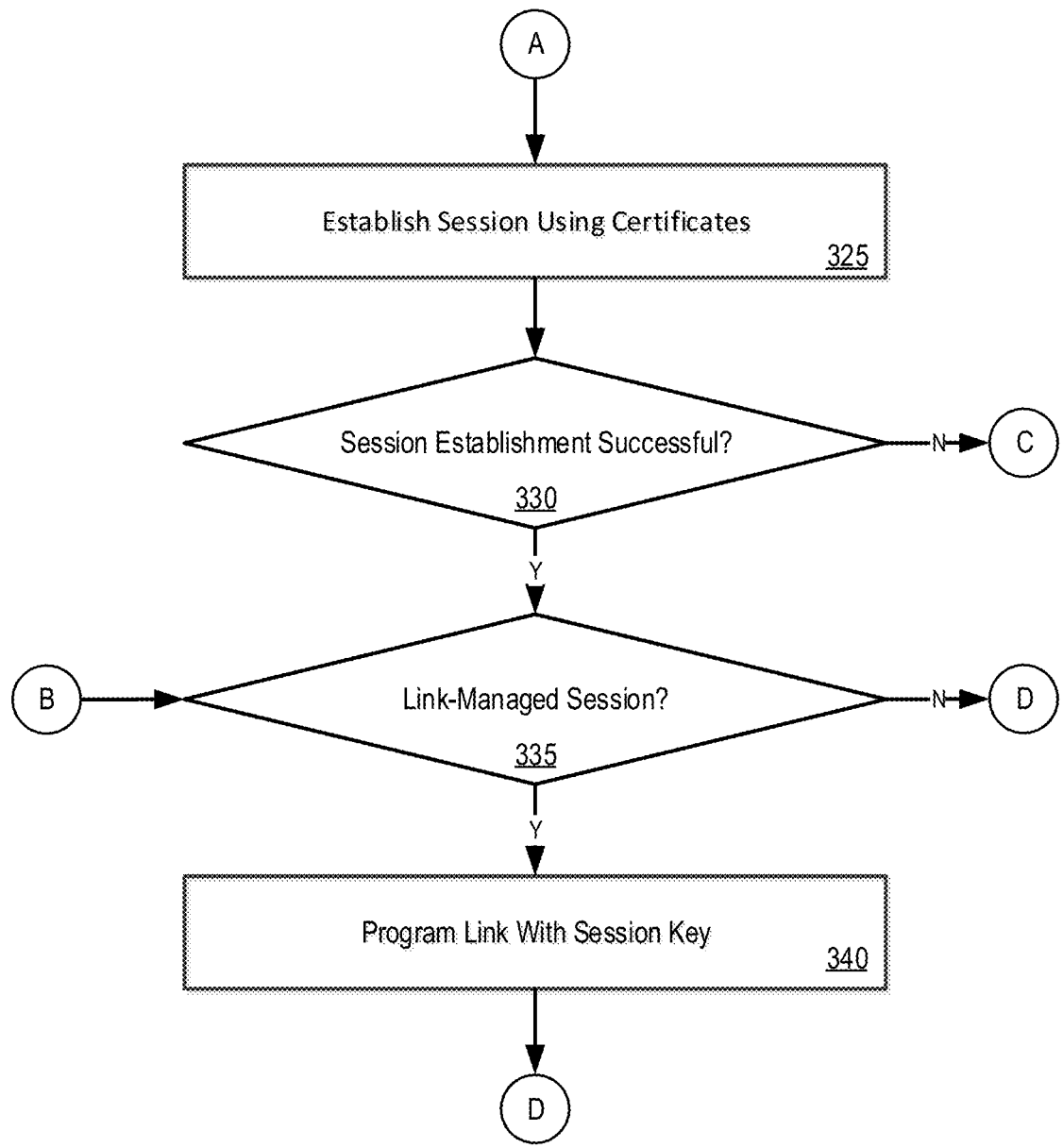
Figure 3C:
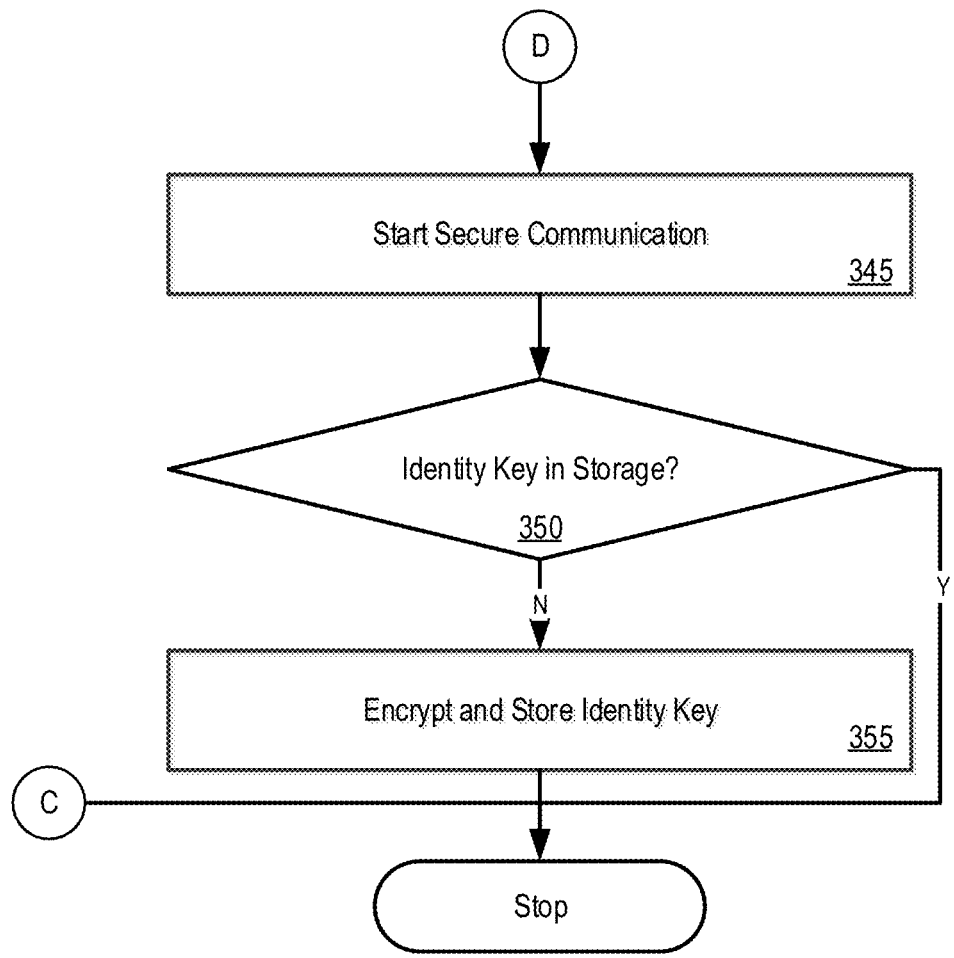

FIGS. 3A-3C a flow diagram illustrating one embodiment of a process for securing platform components. At processing block 305 (FIG. 3A), dynamic security parameters are synchronized between security engine 240A and security engine 240B. At decision block 310, a determination is made as to whether an identity key is stored at non-volatile memories 220 at each package. If so, the identity key is decrypted, the session key is derived, and the session is established, processing block 315. At decision block 320, a determination is made as to whether the session has been successfully established.

Upon a determination at decision block 320 that the session has not been successfully established, or at decision block 310 that the identity key has not been stored (FIG. 3A), the identity keys are established using certificates and from them the session keys are derived to establish the session, processing block 325 (FIG. 3B). At decision block 330, a determination is again made as to whether the session has been successfully established. If not, the session has failed, and the process has been completed (FIG. 3C).

Upon a determination at decision block 320 or decision block 330 that the session has been successfully established, a determination is made as to whether the session is a link-managed session, decision block 335. If so, the interface links 235 are programmed with the session key, processing block 340. Subsequently, or upon a determination that the session is not a link-managed session, secure communication is started, processing block 345 (FIG. 3C). At decision block 350, a determination is made as to whether an identity key has already been stored. If not, the identity key is encrypted and stored, processing block 355. Otherwise, the process is completed.

Once the secure session is established, various flows may occur between CPU 112 and chipset 210 via security engines 240A and 240B to support access to various secure resources. For access to field programmable fuses (FPFs) 245 at chipset 210, security engine 240A transmits secure read/write requests of FPFs 245 to security engine 240B. As a result, security engine 240B performs operations and provides secure responses to security engine 240A.

For access to protected real time clock (PRTC) 250 physical content at chipset 210, security engine 240A transmits secure read/write requests of PRTC 250 content to security engine 240B. Subsequently, security engine 240B may perform the operations itself or proxy the requests to a security and management engine (CSME) 260 within PCH 210. Security engine 240B then provides secure responses to security engine 240A.

In one embodiment, files stored at non-volatile memory 220 are accessible by CPU 112. For read accesses, security engine 240A transmits a request to security engine 240B to read file content via the secure channel. Subsequently, security engine 240B transmits the request to CSME 260, which reads the file from non-volatile memory 220B. CSME 260 may perform an anti-replay check if there are any anti-replay requirements for the file. CSME 260 then responds to security engine 240B with the file contents. Security engine 240B may perform an integrity check upon a determination that the file is integrity-protected and decrypts the file if confidentiality-protected. Finally, security engine 240B transmits the file contents to security engine 240A via the secure channel.

For write accesses, security engine 240A transmits a request to security engine 240B to write file content via the secure channel. Security engine 240B encrypts the file if the file needs to be confidentiality-protected and adds an integrity code if the file needs to be integrity-protected. Security engine 240B then requests CSME 260 to write the file to non-volatile memory 220B. CSME 260 updates an anti-replay counter and writes it to non-volatile memory 220B. CSME 260 then transmits an acknowledgment to security engine 240B that the operation has been completed. Finally, security engine 240B transmits an acknowledgment to security engine 240A that the operation has been completed.

Generation Matching

For IP agents 230 having firmware, rollbacks may occur from a newer firmware version with no known security vulnerabilities to an older firmware version with a known security vulnerability. Security Version Numbers (SVNs) are used to both protect security assets from such roll-back of an agent's firmware code (termed "trusted computing based (TCB SVN)") as well as to prevent such rollbacks altogether (termed "anti-rollback (ARB SVN)"). In one embodiment, ARB SVN values are maintained in FPFs 245.

In cases in which a security engine 240 depends on security of another security engine 240, the TCB SVNs of each become coupled. For example, if a security engine 240A depends on security engine 240B for encrypting/decrypting files, security engine 240B must ensure that security engine 240A's TCB SVN is acceptable. Otherwise, if security engine 240B provides a decrypted file to a compromised security engine 240A, security engine 240A (e.g., having a lower TCB SVN) would be allowed to gain access to a security asset that has a higher SVN. As another example, if security engine 240A depends on security engine 240B for integrity protection of files, security engine 240A must ensure that security engine 240B's TCB SVN is acceptable. Otherwise, if a compromised security engine 240B performs the integrity check on behalf of security engine 240A, this would allow security engine 240B with a lower TCB SVN to "fool" security engine 240A and provide it with a bogus value.

Figure 4:
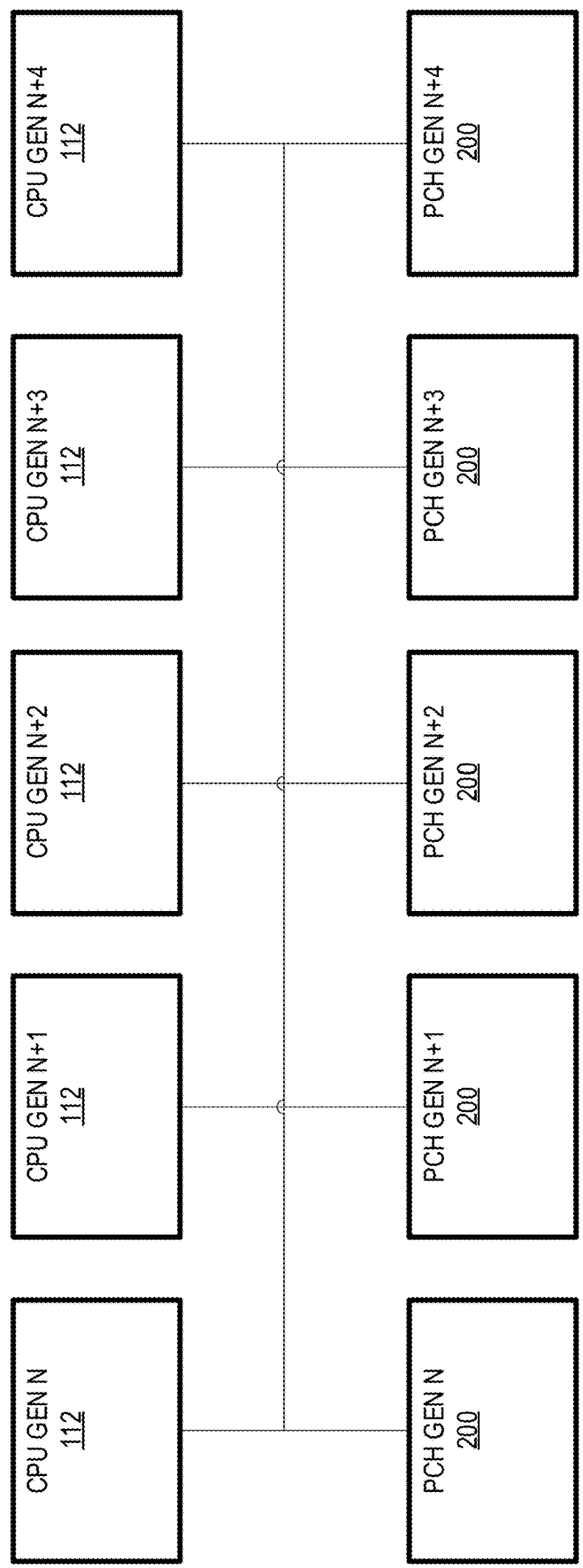
FIG. 4 illustrates one embodiment of generation matching between platform components.

Generation (X-gen) compatibility is required for swappable CPU 112 and chipset 210. In such an embodiment, both forward and backwards compatibility is implemented across multiple generations, with no upper boundary for number of generations. While in a particular platform instance at a given time, it is acceptable to limit the number CPU 112 generations that can be plugged into that platform instance, there is generally no limit to the number of CPU 112 generations that can be paired to a given platform. One common example is not that of linear progression in CPU generations that can be paired to a particular platform, but surprise cases in which new unplanned CPU stop-gaps are defined (e.g., with newer architecture on an older process). Thus, there is inherently no way to know the number of such unplanned CPU generations in advance. FIG. 4 illustrates one embodiment of generation compatibility requirement between platform components using two generations forward and two generations backward.

According to one embodiment, image versioning and content are provided to support backward and forward compatibility between a CPU 112 and a chipset 210. In such an embodiment, image content and an image version progression are provided that are associated with a specific chipset generation for a chipset 210, while image content and image version numbers are associated with a CPU/chipset combination for a CPU 112 are also provided. For example, each IP agent 230 within a CPU 112 (or CPU IP)

will have three versions of code in an embodiment in which a particular CPU 112 generation may be coupled with three different chipset 210 generations, wherein each code version has a different image version progression and may have different content.

In a further embodiment, an image deployed for a given platform generation includes images for IPs 230 included within a chipset 210 (or chipset IPs), as well as CPU IP images for CPUs 112 that may be paired with the chipset 210. In yet a further embodiment, extraneous CPU images may be removed prior to deploying to the platform prior to being stored to non-volatile memory.

Figure 5:
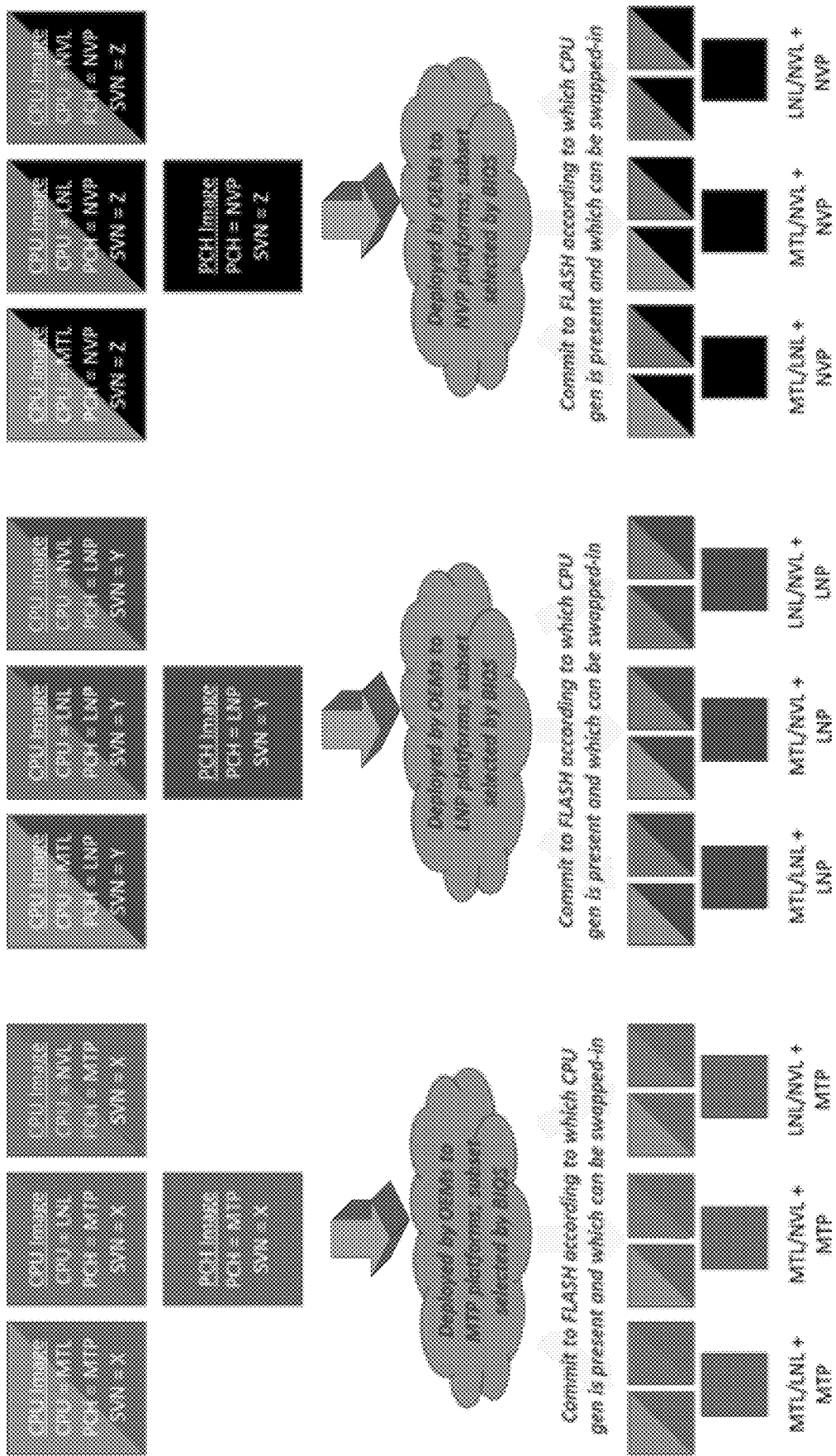
FIG. 5 illustrates one embodiment of image versioning for generation matching between platform components.

According to one embodiment, the structure for chipset IP images comprises a manifest field that includes an identifier of the chipset 210 generation and a manifest field that includes the SVN value. The structure for CPU IP images comprises a manifest field that includes an identifier of the CPU 112 generation, a manifest field that includes the identifier of the associated chipset 210 generation and a manifest field that includes the SVN value. In a further embodiment, a single SVN value is shared between security IP agent 230 firmware for a chipset 210 and the security IP firmware for all CPUs 112 that are paired with the particular chipset 210 generation. Consequently, there is a single instance of ARB SVN in chipset 210 FPFs 245, regardless of the quantity of CPU 112 generations that are associated with the chipset 210. Additionally, an SVN increment occurs for all images upon the detection of a security vulnerability in the chipset 210 image or any of the CPU 112 images associated with the chipset 210. FIG. 5 illustrates one embodiment of image versioning for generation compatibility between platform components, which demonstrates various different images, using generation examples denoted as MTL/MTP, LNL/LNP, and NVL/NVP.

In one embodiment, a determination that a security engine 240 has loaded firmware prior to establishing the secure session channel (discussed above) results in each security engine 240 being able to only enforce that it's running an image compatible to its own generation and possibly ARB SVN (e.g., if ARB SVN can be accessed before loading the image). This is allowed prior to secure session establishment since there are no assets transferred or secure privileges provided between CPU 112 and chipset 210. In a further embodiment, peer generation and SVN matching is enforced during the process of establishing the secure channel using certificates. In such an embodiment, the process is performed via a comparison.

Figure 6:
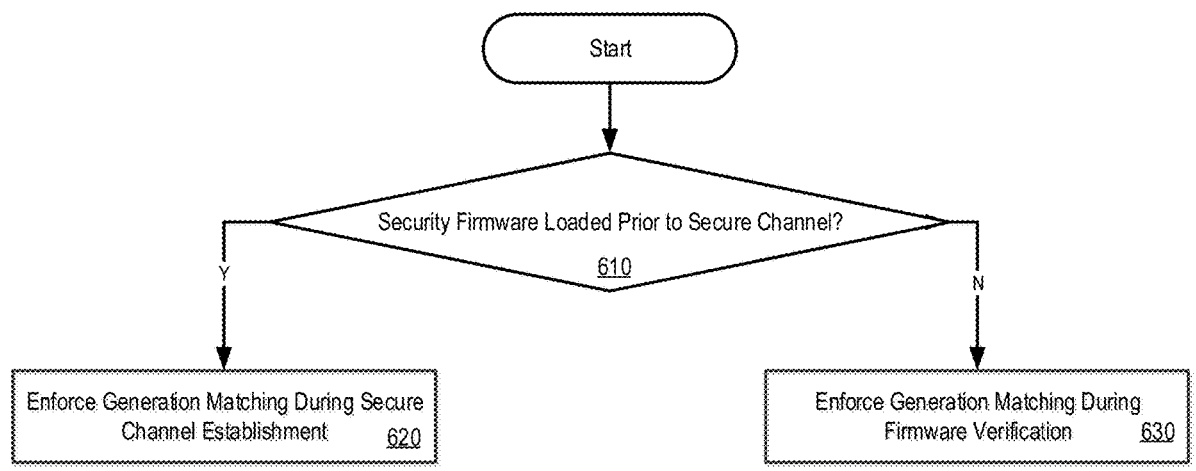
FIG. 6 is a flow diagram illustrating one embodiment of a process for enforcing generation pairing.

FIG. 6 is a flow diagram illustrating one embodiment of a process for enforcing generation pairing. At decision block 610, a determination is made as to whether security engine 240 firmware has been loaded prior to the secure channel being established. If so, the security engine 240 enforces the generation matching during secure channel establishment to confirm that a peer security engine 240 generation (e.g., for a security engine 240 within CPU 112) and SVN (e.g., regardless of security engine 240 location) match the values in the security engine 240 firmware manifest, processing block 620.

Upon a determination that the secure channel has been established prior to the security engine 240 firmware being loaded, the security engine 240 enforces the generation matching during firmware verification that security engine 240 generation and SVN (e.g., as queried securely from the peer after Secure Channel establishment) match those that appear in the Security IP's manifest, processing block 630. Based on the above, security engines 240 at both CPU 112 and chipset 210 both enforce that there is no scenario in which trust is established with an incompatible or compromised firmware.

In one embodiment, the failure action in case of mismatch attempts to load an alternative image (e.g., including a reset action such as global reset, if needed) or download one from an external source. Because of the enforcement of a matching SVN during boot, the image update operation ensures that both the chipset IP images and CPU IP images of a previous image (e.g., which had matching SVNs) do not get erased from non-volatile memory prior to both chipset IP images and CPU IP images of the new image being fully committed to non-volatile memory. Otherwise, a power-loss event during image update may lead to a case of having chipset IP images and CPU IP images of mismatching SVNs (e.g., one being old, one being new), which will lead to a denial of service due to enforcement since not all platforms support downloading an image from an external source.

Although described above with regards to one embodiment of enforcing generation pairing, Table 1 shows other options for enforcing generation pairing during session establishment, while Table 2 shows other options for enforcing generation pairing during firmware verification.

TABLE 1

|  | Peer is pre-FW (Certificate will show) | Peer is FW (Certificate will show) |
| --- | --- | --- |
| I am pre-FW | No peer Gen/SVN enforcement. But record peer's Gen/SVN information. Enforcement point: When each peer later verifies its FW (Table 2, right column). | No peer Gen/SVN enforcement. But record peer's Gen/SVN information. Enforcement point: When I later verify my FW (Table 2, right column). |
| I am FW Chipset | No peer Gen/SVN enforcement. But record peer's Gen/SVN information. Enforcement point: When CPU later verifies its FW (Table 2, bottom-right cell). | Certificate produced by peer (ROM) contains Gen and SVN. Enforce that peer's SVN matches my SVN in my manifest before allowing session establishment to complete. |
| I am FW Chipset | No peer Gen/SVN enforcement. But record peer's Gen/SVN information. Enforcement point: When PCH later verifies its FW (Table 2, top-right cell). | Certificate produced by peer (ROM) contains Gen and SVN. Enforce that peer's Gen + SVN match the Chipset Gen in my manifest + my SVN in my manifest before allowing session establishment to complete. |

TABLE 2

|  | Session not established yet | Session already established |
| --- | --- | --- |
| I am pre-FW Chipset | No peer Gen/SVN enforcement. Enforcement point: When session is later established (Table 1, middle-right cell). | Enforce that peer's SVN matches my SVN in my manifest before verification is approved. |
| I am pre-FW CPU | No peer Gen/SVN enforcement. Enforcement point: When session is later established (Table 1, bottom-right cell). | Enforce that peer's Gen + SVN match the Chipset Gen in my manifest + my SVN in my manifest before verification is approved. |

Boot security technology reduces a chance of malware exploiting platform hardware and/or software components. Boot security provides a hardware-based Static Root of Trust for Verification (RTV) and optional Root of Trust for Measurement (RTM). During implementation of boot security CPU microcode launches an authenticated code module (ACM) prior to basic input/output system ("BIOS") execution. Subsequently, the ACM cryptographically verifies BIOS code called Initial Boot Block (IBB) before it is executed. The IBB may then carry forward the verification chain. The boot security is typically executed using a boot policy stored in FPFs on the chipset. However, in some instances, swappable CPUs may be inserted into a platform that does not include a compatible chipset that includes the boot policy.

According to one embodiment, the boot policy is provisioned in non-volatile memory. In such an embodiment, the CPU reads the boot policy from the non-volatile memory to perform boot security verification. In a further embodiment, a security engine is included in the platform to operate as a platform root of trust (PRoT) that provides protection to the boot policy stored in the non-volatile memory.

Figure 7:
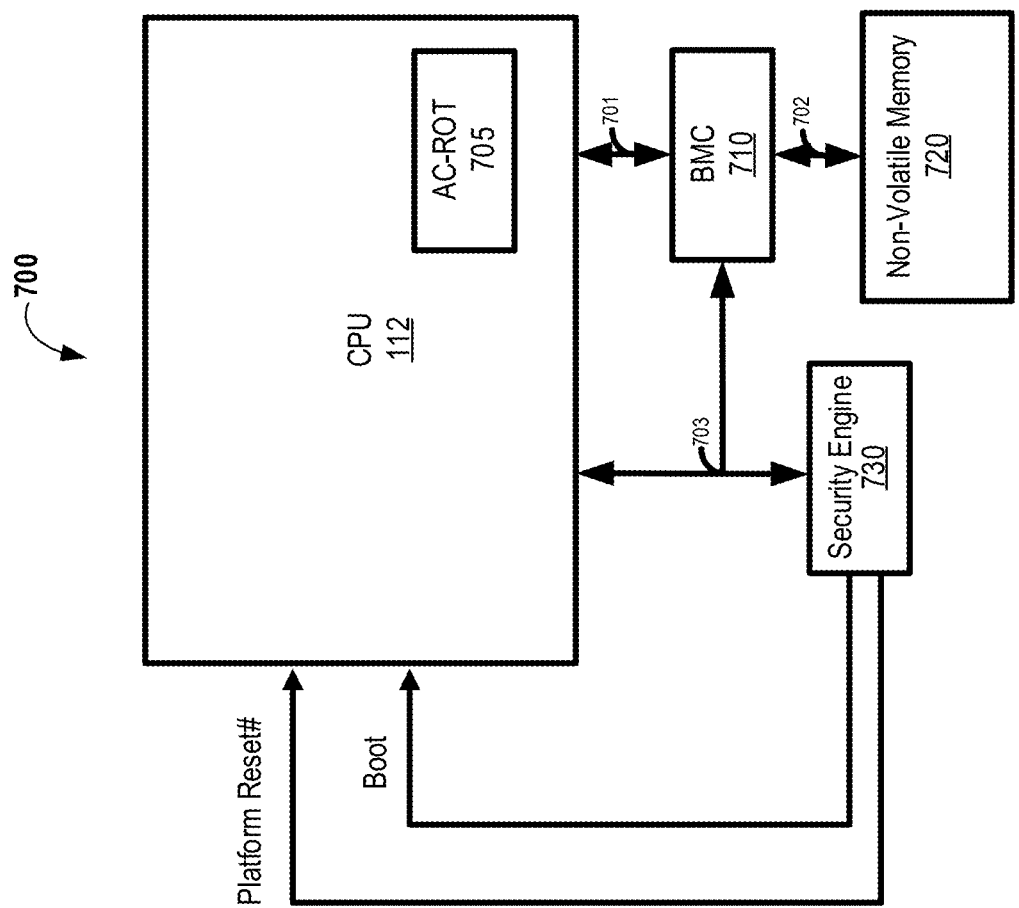
FIG. 7 illustrates another embodiment of a platform.

FIG. 7 illustrates another embodiment of a platform 700. As shown in FIG. 7, CPU 112 is coupled to a Board Management Controller (BMC) 710 via an interface 701. BMC 710 is also coupled to non-volatile memory via an interface 702, and to security engine 730 via interface 703. Additionally, BMC 710 may be connected to a network via an internal ethernet controller (not shown). CPU 112 and security engine 730 are also coupled via interface 703. In one embodiment, BMC 710 is a specialized service processor that manages and monitors the physical state of platform independent of CPU 112. In a further embodiment, interface 701 comprises an enhanced Serial Peripheral Interface Bus (eSPI), interface 701 comprises a Serial Peripheral Interface Bus (SPI) and interface 703 comprises a serial communication bus (e.g., I3C or system management bus (SMBus)).

Figure 8:
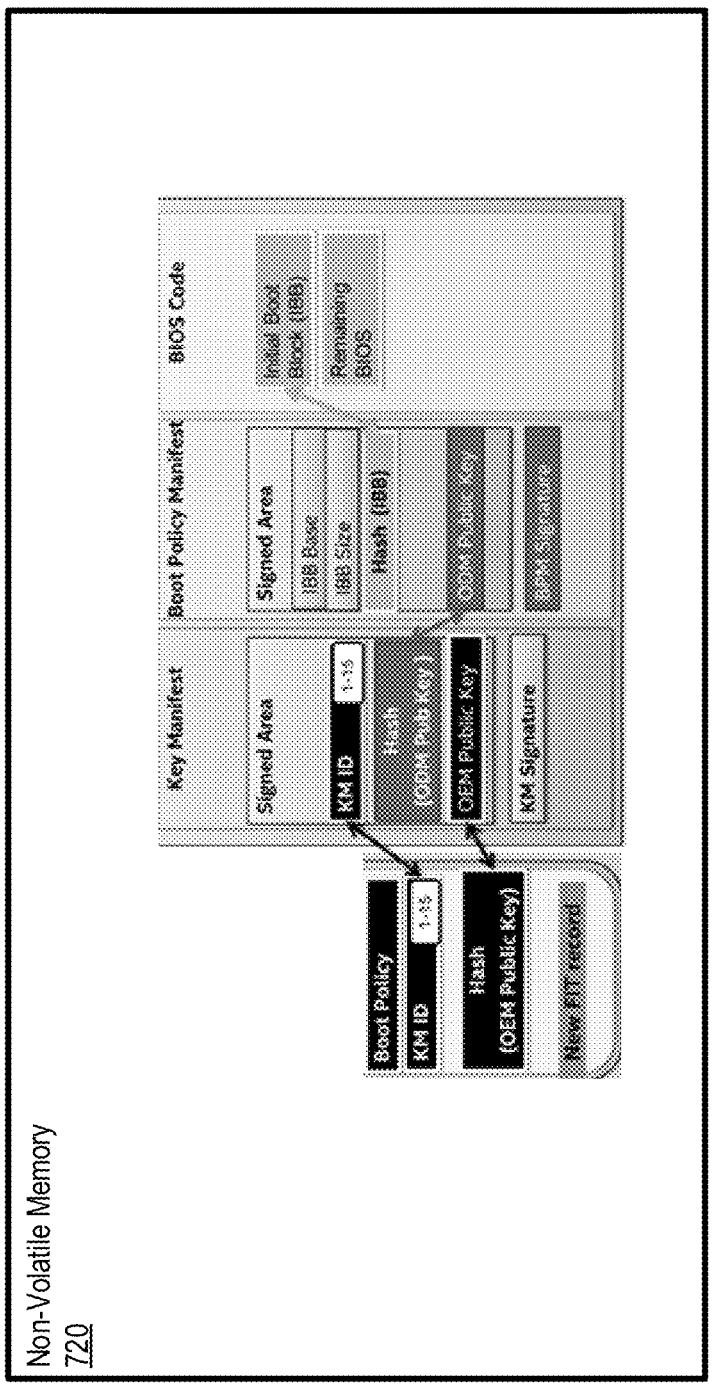
FIG. 8 illustrates one embodiment of a non-volatile memory.

As discussed above, security engine 730 implements a PROT to monitor non-volatile memory 720, as well as other components on platform 700. CPU 112 implements an active component Root of Trust (AC-ROT) 705, which is responsible for measuring and reporting processor firmware code and data elements. In one embodiment, AC-ROT comprises a Secured Startup Services Module (S3M). FIG. 8 illustrates one embodiment of non-volatile memory 720. As shown in FIG. 8, non-volatile memory 720 includes BIOS code, boot policy manifest and a key manifest. As previously mentioned, non-volatile memory 720 also includes the platform 200 boot policy. In one embodiment, the non-volatile memory 720 is programmed with boot keys and policies during system manufacturing. In a further embodiment, security engine 730 internal persistent storage is also programmed with the boot policy, or a cryptographic measurement of the boot policy content.

Figure 9:
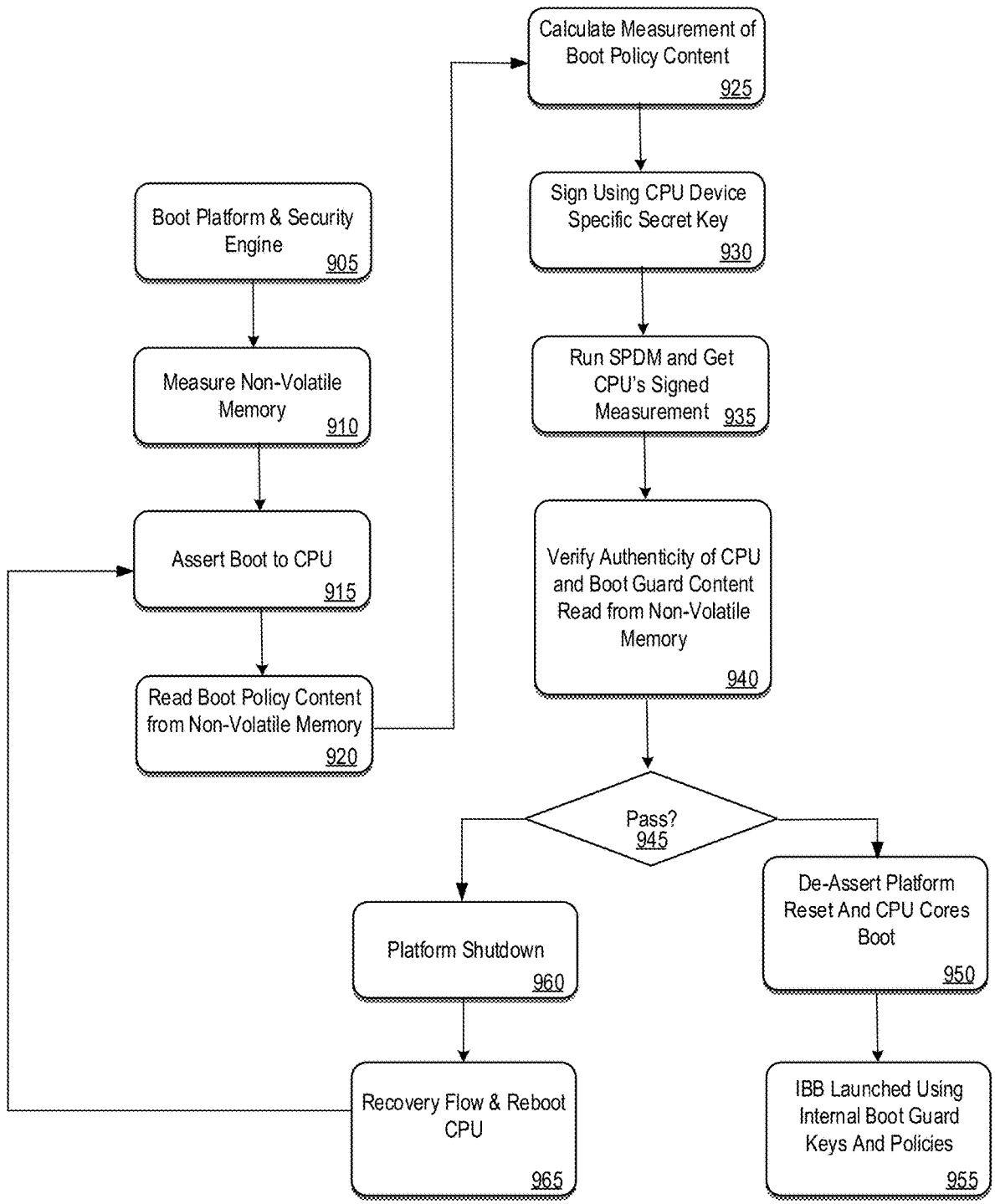
FIG. 9 is a flow diagram illustrating one embodiment of a boot security process.

FIG. 9 is a flow diagram illustrating one embodiment of a boot process implementing the boot policy stored at non-volatile memory 720. At processing block 905, platform 200 and security engine 730 are booted. At processing block 910, security engine 730 is brought out of reset and calculates a cryptographic measurement of the boot policy content stored in internal persistent storage. However, in another embodiment, the cryptographic measurement of the boot policy content may be stored in advance. At processing block 915, security engine 730 asserts a signal (e.g., AUXPWRGOOD) to boot CPU 112. In one embodiment, the CPU reset remains asserted and the cores are not able to execute boot code at this time.

At processing block 920, AC-ROT 705 at CPU 112 reads the boot policy content from non-volatile memory 720 via interfaces 701 and 702. At processing block 925, AC-ROT 705 calculates a cryptographic measurement of boot the policy content. At processing block 930, the calculated cryptographic measurement is digitally signed using a device specific key that is unique to CPU 112. At processing block 935, security engine 730 implements a secure protocol & data model (SPDM) to perform a SPDM challenge and requests signed cryptographic measurements from CPU 112. As a result, AC-ROT 705 provides the signed cryptographic measurement in response to the measurement request.

At processing block 940, security engine 730, verifies the authenticity of CPU 112 and boot policy content read from non-volatile memory 720. During verification, security engine 730 ensures that the CPU 112 attested data is authentic, and that the boot policy content was not tampered with when read by CPU 112 from non-volatile memory 720. At decision block 945, a determination is made as to whether authenticity has been verified (e.g., passed). In one embodiment, the authentication passes upon a determination that the cryptographic measurement of the boot policy content stored at security engine 730 matches the cryptographic measurement of the boot policy content received from AC-ROT 705.

Upon a determination at decision block 945 that the authenticity has been verified, the platform reset is de-asserted, and the CPU 112 cores are booted, processing block 950. At processing block 955, an initial boot block in non-volatile memory 720 is launched using the boot policies and keys. Platform 200 is shut down upon a determination at decision block 945 that the authenticity has not been verified, processing block 960. At processing block 965, a recovery flow is performed, and CPU 112 is rebooted. Subsequently, control is returned to processing block 915, where the AUXPWRGOOD signal is re-asserted to boot CPU 112.

Figure 10:
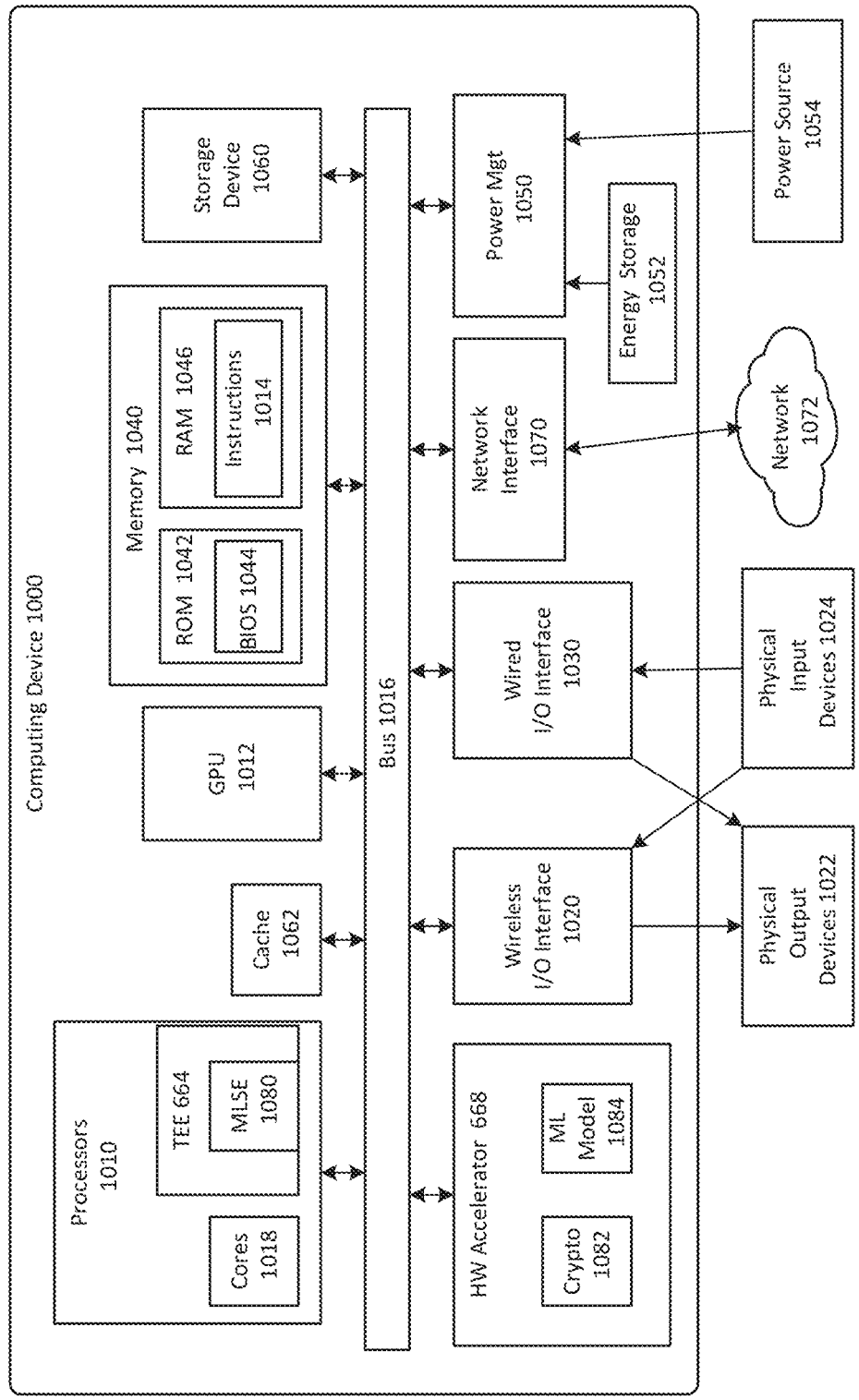
FIG. 10 illustrates one embodiment of a schematic diagram of an illustrative electronic computing device.

FIG. 10 is a schematic diagram of an illustrative electronic computing device to enable enhanced protection against adversarial attacks according to some embodiments. In some embodiments, the computing device 1000 includes one or more processors 1010 including one or more processors cores 1018 and a TEE 1064, the TEE including a machine learning service enclave (MLSE) 1080. In some embodiments, the computing device 1000 includes a hardware accelerator 1068, the hardware accelerator including a cryptographic engine 1082 and a machine learning model 1084. In some embodiments, the computing device is to provide enhanced protections against ML adversarial attacks, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 700, since in certain embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random-access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include but are not limited to: universal serial bus (USB), IEEE 1394 ("FireWire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry v12. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a computer platform, including a central processing unit (CPU) comprising a first security engine to perform security operations at the CPU and a chipset comprising a second security engine to perform security operations at the chipset, wherein the first security engine and the second security engine establish a secure channel session between the CPU and the chipset to secure data transmitted between the CPU and the chipset.

Example 2 includes the subject matter of Example 1, wherein the first security engine and the second security engine establish an identity key prior to establishing the secure session channel.

Example 3 includes the subject matter of Examples 1 and 2, wherein the identity key is used to generate a session key.

Example 4 includes the subject matter of Examples 1-3, wherein the security parameters comprise dynamic parameters including parameters for which there is a functional reason to pair the CPU and the chipset.

Example 5 includes the subject matter of Examples 1-4, wherein the first security engine and the second security initiate secure session channel establishment after the dynamic parameters have been synchronized.

Example 6 includes the subject matter of Examples 1-5, wherein the first security engine and the second security engine read the identity key stored from a previous secure channel session.

Example 7 includes the subject matter of Examples 1-6, wherein the CPU further comprises a first interface; and a first set of interconnect protocol agents.

Example 8 includes the subject matter of Examples 1-7, wherein the chipset further comprises a second interface and a second set of interconnect protocol agents.

Example 9 includes the subject matter of Examples 1-8, wherein the first security engine programs the first interface with the first secure session key and the second security engine programs the second interface with the first secure session key.

Example 10 includes the subject matter of Examples 1-9, wherein the first set of interconnect protocol agents communicate with the second set of interconnect protocol agents once the first interface and the second interface have been programmed with the first secure session key.

Example 11 includes the subject matter of Examples 1-10, wherein one or more of the first set of interconnect protocol agents comprise first image content and a first image version progression associated with a CPU-chipset generation combination for a CPU, and one or more of the second set of interconnect protocol agents comprise second image content and a second image version progression associated with a chipset generation associated with the chipset.

Example 12 includes the subject matter of Examples 1-11, wherein the first image content comprises a first manifest field including an identifier of a CPU generation, a second manifest field including an identifier of an associated chipset generation and a third manifest field including a first security version number (SVN) value.

Example 13 includes the subject matter of Examples 1-12, wherein the second image content comprises a first manifest field including an identifier of a chipset generation and a second manifest field including a second SVN value.

Example 14 includes the subject matter of Examples 1-13, wherein the second security engine enforces SVN matching during establishment of the secure channel to confirm that the first security engine has a matching SVN.

Example 15 includes the subject matter of Examples 1-14, wherein upon a determination that its firmware has been loaded prior to establishing the secure session channel, the first security engine enforces generation and SVN matching during establishment of the secure channel to confirm that the second security engine has a generation and SVN matching the first engine.

Example 16 includes the subject matter of Examples 1-15, wherein upon a determination that its firmware has not been loaded prior to establishing the secure session channel, the first security engine enforces generation and SVN matching during firmware verification to confirm that the first security engine image has a generation and SVN matching the second security engine.

Some embodiments pertain to Example 17 that includes a method comprising establishing an identity key between a first security engine at a central processing unit (CPU) and a second security engine at a chipset, generating a secure session key based on the identity key and establishing a secure session channel to secure data transmitted between the CPU and the chipset based on the secure session key.

Example 18 includes the subject matter of Example 17, further comprising synchronizing dynamic parameters between the CPU and the chipset.

Example 19 includes the subject matter of Examples 17 and 18, further comprising the first security engine programming a first interface at the CPU with the first secure session key after the secure session channel has been established; and the second security engine programming a second interface at the chipset with the first secure session key after the secure session channel has been established.

Example 20 includes the subject matter of Examples 17-19, further comprising establishing communication between a first set of interconnect protocol agents at the CPU and a second set of interconnect protocol agents at the chipset once the first interface and the second interface have been programmed with the first secure session key.

Some embodiments pertain to Example 21 that includes at least one computer readable medium having instructions stored thereon, which when executed by one or more processors, cause the processors to establish an identity key between a first security engine at a central processing unit (CPU) and a second security engine at a chipset; generate a secure session key based on the identity key and establish a secure session channel to secure data transmitted between the CPU and the chipset based on the secure session key.

Example 22 includes the subject matter of Example 22, having instructions stored thereon, which when executed by one or more processors, further cause the processors to initiate secure session channel establishment after the dynamic parameters have been synchronized.

Example 23 includes the subject matter of Examples 21 and 22, having instructions stored thereon, which when executed by one or more processors, further cause the processors to program a first interface at a CPU with the first secure session key after the secure session channel has been established and program a second interface at the chipset with the first secure session key after the secure session channel has been established.

Example 24 includes the subject matter of Examples 21-23, computer readable medium of claim 19, having instructions stored thereon, which when executed by one or more processors, further cause the processors to establish secure communication between a first set of interconnect protocol agents at the CPU and a second set of interconnect protocol agents at the chipset once the first interface and the second interface have been programmed with the first secure session key.

Some embodiments pertain to Example 25 that includes an apparatus comprising a computer platform, including a non-volatile memory to store a boot policy, central processing unit (CPU) to read the boot policy from the non-volatile memory to perform boot security verification and a security engine to operate as a platform root of trust to provide protection for the boot policy.

Example 26 includes the subject matter of Example 25, further comprising a board management controller coupled between the non-volatile memory, the CPU and the security engine via a plurality of interfaces.

Example 27 includes the subject matter of Examples 25 and 26, wherein a first cryptographic measurement of the boot policy content is stored in the security engine.

Example 28 includes the subject matter of Examples 25-27, wherein the security engine asserts a signal to boot the CPU.

Example 29 includes the subject matter of Examples 25-28, wherein a secured startup services module S3M at the CPU reads the boot policy content from the non-volatile memory and calculates a second cryptographic measurement of the boot policy content received from the non-volatile memory.

Example 30 includes the subject matter of Examples 25-29, wherein the S3M digitally signs the second cryptographic measurement of the boot policy content with a key unique to the CPU.

Example 31 includes the subject matter of Examples 25-30, wherein the security engine receives the digitally signed second cryptographic measurement of the boot policy content from the CPU and verifies the authenticity of the CPU and the second cryptographic measurement of the boot policy.

Example 32 includes the subject matter of Examples 25-31, wherein the security engine authenticates the second cryptographic measurement of the boot policy content upon a determination that the second cryptographic measurement of the boot policy content matches the first cryptographic measurement of the boot policy content.

The embodiments have been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:
1. An apparatus comprising:
   a computer platform, including:
      a central processing unit (CPU) comprising a first security engine to perform security operations at the CPU; and
      a chipset comprising a second security engine to perform security operations at the chipset, wherein the first security engine and the second security engine establish an identity key and generate a secure session key based on the identity key to secure channel session between the CPU and the chipset to secure data transmitted between the CPU and the chipset.

2. The apparatus of claim 1, wherein the identity key is derived from values stored in the CPU and the chipset.

3. The apparatus of claim 1, wherein the secure session channel is established using dynamic security parameters including parameters for which there is a functional reason to pair the CPU and the chipset.

4. The apparatus of claim 3, wherein the first security engine and the second security engine initiate secure session channel establishment after the dynamic security parameters have been synchronized to a compatible state.

5. The apparatus of claim 1, wherein the first security engine and the second security engine read the identity key stored from a previous secure channel session.

6. The apparatus of claim 1, wherein the CPU further comprises:
a first interface; and
a first set of interconnect protocol agents.

7. The apparatus of claim 6, wherein the chipset further comprises:
a second interface; and
a second set of interconnect protocol agents.

8. The apparatus of claim 7, wherein the first security engine programs the first interface with the secure session key and the second security engine programs the second interface with the secure session key.

9. The apparatus of claim 8, wherein the first set of interconnect protocol agents communicate with the second set of interconnect protocol agents once the first interface and the second interface have been programmed with the secure session key.

10. The apparatus of claim 7, wherein one or more of the first set of interconnect protocol agents comprise first image content and a first image version progression associated with a CPU-chipset generation combination for the CPU, and one or more of the second set of interconnect protocol agents comprise second image content and a second image version progression associated with a chipset generation associated with the chipset.

11. The apparatus of claim 10, wherein the first image content comprises a first manifest field including an identifier of a CPU generation, a second manifest field including an identifier of an associated chipset generation and a third manifest field including a first security version number (SVN) value.

12. The apparatus of claim 11, wherein the second image content comprises a first manifest field including an identifier of a chipset generation and a second manifest field including a second SVN value.

13. The apparatus of claim 12, wherein the second security engine enforces SVN matching during establishment of the secure channel to confirm that the first security engine has a matching SVN.

14. The apparatus of claim 12, wherein the first security engine enforces generation and SVN matching during establishment of the secure channel to confirm that the second security engine has a generation and SVN matching the first engine upon a determination that its first security engine firmware has been loaded prior to establishing the secure session channel.

15. The apparatus of claim 12, wherein the first security engine enforces generation and SVN matching during firmware verification to confirm that a first security engine image has a generation and SVN matching the second security engine upon a determination that its first security engine firmware has not been loaded prior to establishing the secure session channel.

16. A method comprising:
establishing an identity key between a first security engine at a central processing unit (CPU) and a second security engine at a chipset;
generating a secure session key based on the identity key; and
establishing a secure session channel to secure data transmitted between the CPU and the chipset based on the secure session key.

17. The method of claim 16, further comprising synchronizing dynamic security parameters between the CPU and the chipset to a compatible state.

18. The method of claim 16, further comprising:
the first security engine programming a first interface at the CPU with the first secure session key after the secure session channel has been established; and
the second security engine programming a second interface at the chipset with the first secure session key after the secure session channel has been established.

19. The method of claim 18, further comprising establishing communication between a first set of interconnect protocol agents at the CPU and a second set of interconnect protocol agents at the chipset once the first interface and the second interface have been programmed with the first secure session key.

20. At least one computer readable medium having instructions stored thereon, which when executed by one or more processors, cause the processors to:
establish an identity key between a first security engine at a central processing unit (CPU) and a second security engine at a chipset;
generate a secure session key based on the identity key; and
establish a secure session channel to secure data transmitted between the CPU and the chipset based on the secure session key.

21. The computer readable medium of claim 20, having instructions stored thereon, which when executed by one or more processors, further cause the processors to initiate secure session channel establishment after dynamic security parameters have been synchronized to a compatible state.

22. The computer readable medium of claim 21, having instructions stored thereon, which when executed by one or more processors, further cause the processors to:
program a first interface at a CPU with the first secure session key after the secure session channel has been established; and
program a second interface at the chipset with the first secure session key after the secure session channel has been established.

23. The computer readable medium of claim 22, having instructions stored thereon, which when executed by one or more processors, further cause the processors to establish secure communication between a first set of interconnect protocol agents at the CPU and a second set of interconnect protocol agents at the chipset once the first interface and the second interface have been programmed with the first secure session key.

* * * * *